US012691883B2

(12) United States Patent
Feng et al.

(10) Patent No.: US 12,691,883 B2
(45) Date of Patent: Jul. 28, 2026

(54) DRIVING CONDITION DETERMINATION AND COMMUNICATION SYSTEM WITH CONNECTED VEHICLES

(71) Applicant: FCA US LLC, Auburn Hills, MI (US)

(72) Inventors: Xin Feng, Troy, MI (US); Adam R Goodes, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 113 days.

(21) Appl. No.: 18/647,439

(22) Filed: Apr. 26, 2024

(65) Prior Publication Data
US 2025/0333063 A1 Oct. 30, 2025

(51) Int. Cl.
 B60W 30/18 (2012.01)
(52) U.S. Cl.
 CPC ... B60W 30/18172 (2013.01); *B60W 2552/40* (2020.02); *B60W 2555/20* (2020.02); *B60W 2556/10* (2020.02); *B60W 2556/65* (2020.02)
(58) Field of Classification Search
 CPC ....... B60W 30/18172; B60W 2552/40; B60W 2555/20; B60W 2556/10; B60W 2556/65
 See application file for complete search history.

(56) References Cited

U.S. PATENT DOCUMENTS

2019/0035101 A1* 1/2019 Kwant ..................... G06T 7/60
2022/0410853 A1* 12/2022 Henderson ............... B60T 8/76

FOREIGN PATENT DOCUMENTS

WO WO-2015121260 A1 * 8/2015 ...... B60W 30/18172

OTHER PUBLICATIONS

Waze Navigation & Live Traffic App; Available on Google Play; (5 pages).
Carmenta; Carmenta TrafficWatch; https://carmenta.com/en/automotive/carmenta-trafficwatch/ (10 pages).

* cited by examiner

*Primary Examiner* — Long T Tran
*Assistant Examiner* — Charles J Brauch
(74) *Attorney, Agent, or Firm* — Jeremy J. Klobucar

(57) ABSTRACT
A method for determining driving conditions from network vehicles, includes receiving at a backend portion information relating to a loss of traction event, associating the loss of traction event with a location, comparing the information relating to the loss of traction event to one or more driving condition thresholds for the location, and sending a notification from the backend portion to multiple vehicles when one or more driving condition thresholds are met. The multiple vehicles may be limited to vehicles associated with the location, and this may include, for example, vehicles in a geographic location including the location or vehicles determined to be heading toward the location.

20 Claims, 3 Drawing Sheets

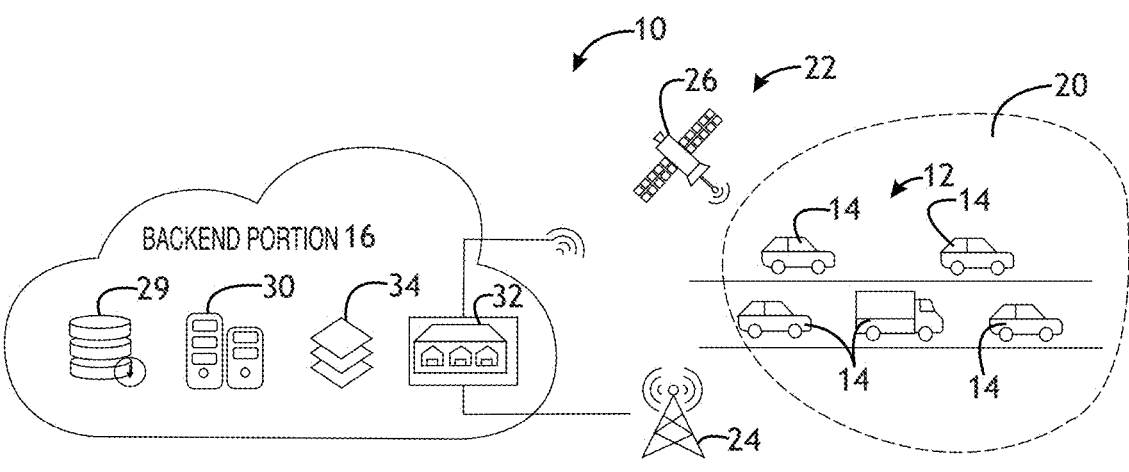
BACKEND PORTION 16
_Fig.1_
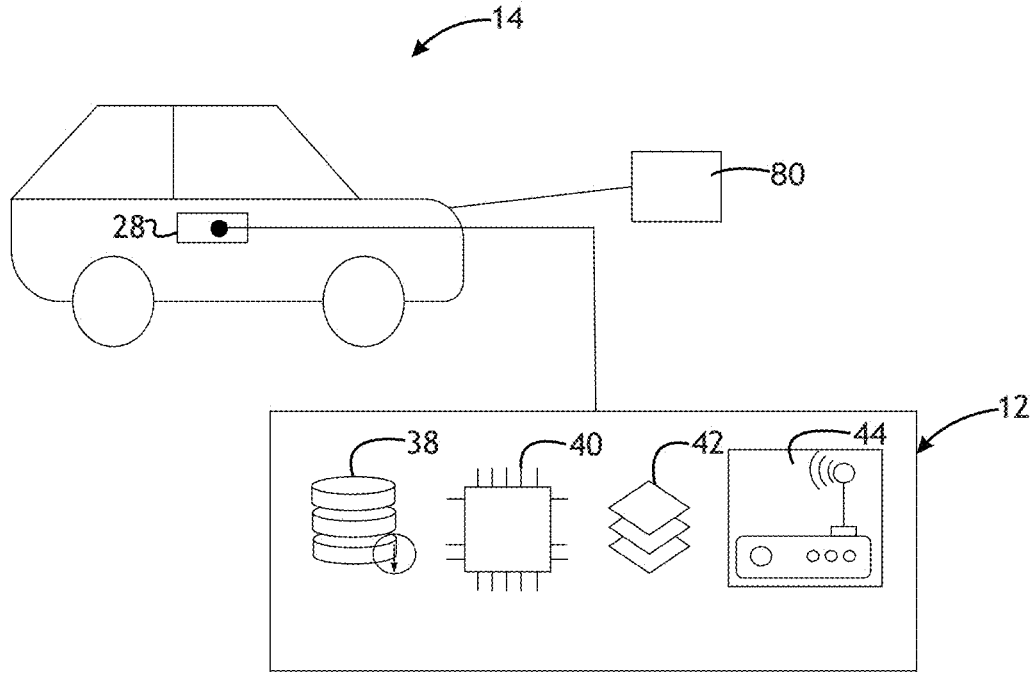
_Fig.2_

DRIVING CONDITION DETERMINATION AND COMMUNICATION SYSTEM WITH CONNECTED VEHICLES

FIELD

The present disclosure relates to systems by which connected vehicles enable determination and communication of one or more driving conditions.

BACKGROUND

Certain geographic regions have conditions, like cold, snowy or icy weather conditions in which road friction is reduced and vehicles traveling on the roads are more likely to experience loss of traction events. Within these regions, smaller areas may experience conditions that elevate the risk of loss of traction events and it can be very difficult to determine the location of such areas. In view of this, weather and traffic services provide wide-ranging notices of conditions that are not relevant to a great number of people receiving the notices. Further, these notices are manually generated and then broadcast.

SUMMARY

In at least some implementations, a method for determining driving conditions from network vehicles, includes receiving at a backend portion information relating to a loss of traction event, associating the loss of traction event with a location, comparing the information relating to the loss of traction event to one or more driving condition thresholds for the location, and sending a notification from the backend portion to multiple vehicles when one or more driving condition thresholds are met. The multiple vehicles may be limited to vehicles associated with the location, and this may include, for example, vehicles in a geographic location including the location or vehicles determined to be heading toward the location.

In at least some implementations, a loss of traction event is determined upon actuation of a vehicle dynamic control system, such as one or more of ABS, ESC, TC and TSA systems.

In at least some implementations, the method includes rating a severity of the loss of traction event based upon one or more event parameters, and comparing the rating to a rating threshold. In at least some implementations, the event parameters include information about one or a combination of one or more of vehicle dynamic parameters, vehicle type parameters, road conditions and environmental conditions. In at least some implementations, the rating is determined as a function of one or both of historical information relating to the vehicle associated with the loss of traction event and historical information relating to the location.

In at least some implementations, the vehicle dynamic parameters include at least one vehicle acceleration at the time of the loss of traction event. In at least some implementations, the environmental conditions include an ambient temperature in the location at the time of the loss of traction event.

In at least some implementations, the method also includes receiving at the backend portion information about one or more environmental conditions. In at least some implementations, the information about one or more environmental conditions includes forecasted weather information. In at least some implementations, at least one of the one or more driving conditions thresholds is set as a function of the forecasted weather information, an ambient temperature in the location, or both.

In at least some implementations, the loss of traction event is one of multiple loss of traction events, and each of the multiple loss of traction events is associated with a particular geographic area in which each of the multiple loss of traction events occurred, and wherein the one or more driving condition thresholds includes a threshold for a number of loss of traction events in each particular geographic area. In at least some implementations, each geographic area is rated with regard to a likelihood of a loss of traction event occurring in a threshold time period from the current time. In at least some implementations, the rating for each geographic area is based at least in part on one or a combination of one or more of an ambient temperature in each geographic area, a forecasted weather condition in each geographic area and historical information relating to one or both of road conditions and environmental conditions in each geographic area.

In at least some implementations, the method includes monitoring information relating to a loss of traction event in each geographic area that has a rating that meets a geographic area rating threshold and not monitoring information relating to a loss of traction event in each geographic area that has a rating that does not meet a geographic area rating threshold.

In at least some implementations, a method is utilized for determining driving conditions in separate geographic areas from network vehicles. The method includes dividing a first geographic area into multiple, smaller second geographic areas, receiving at a backend portion information relating to at least one environmental condition or at least one road condition for each of the second geographic areas, rating each of the second geographic areas with regard to a severity of one or both of the at least one environmental condition and the at least one road condition, receiving at the backend portion information relating to one or more loss of traction events, associating each of the one or more loss of traction events with a respective individual one of the second geographic locations in which it is determined that each of the one or more loss of traction events occurred, comparing the information relating to each of the one or more loss of traction events to one or more driving condition thresholds for the individual one of the second geographic locations, and sending a notification from the backend portion to multiple vehicles associated with the individual one of the second geographic locations when one or more driving condition thresholds are met.

In at least some implementations, the step of comparing the information relating to each of the one or more loss of traction events includes rating each of the one or more loss of traction events with regard to a severity of the loss of traction event. In at least some implementations, the severity is determined at least in part as a function of a duration of actuation of a vehicle dynamic control system. In at least some implementations, the severity is determined as a function of one or more vehicle dynamic parameters at the time of the loss of traction event.

The systems and methods described herein enable automatic detection of loss of traction events, and automatic determination of when and to which vehicles notifications or alerts should be provided. The systems and methods use networked vehicles that automatically provide to a backend portion of the system, information relating to road conditions, environmental conditions and vehicle parameters. The information may be provided during varying environmental conditions over time, with or without occurrences of loss of traction events, to enable comparison of recent loss of traction events with historical information. The conditions and loss of traction events may be rated by the system using thresholds determined by one or more programs. Specific geographic areas may be determined to have a heightened risk of loss of traction events, and notifications may be provided for those specific geographic areas, for example, when the risk in those areas exceeds a risk threshold. The risk threshold may involve a single threshold rating based upon multiple parameters, or individual thresholds for each parameter or some mix of these strategies.

The notifications may be provided automatically as determined by the system such that human determination and broadcasting is not required. The notifications can be provided to only a subset of vehicles in a geographic area, such as those within or heading toward the specific geographic areas having conditions that caused the notification to be sent. Vehicles not associated with the specific areas need not receive the notifications and so vehicles receive fewer notifications that are not relevant to them, and user confidence in the notifications and the systems is increased.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 1 is a diagrammatic view of a system for detecting and determining driving conditions;

FIG. 2 is a diagrammatic view of a vehicle that defines part of the system;

DETAILED DESCRIPTION

Figure 3:
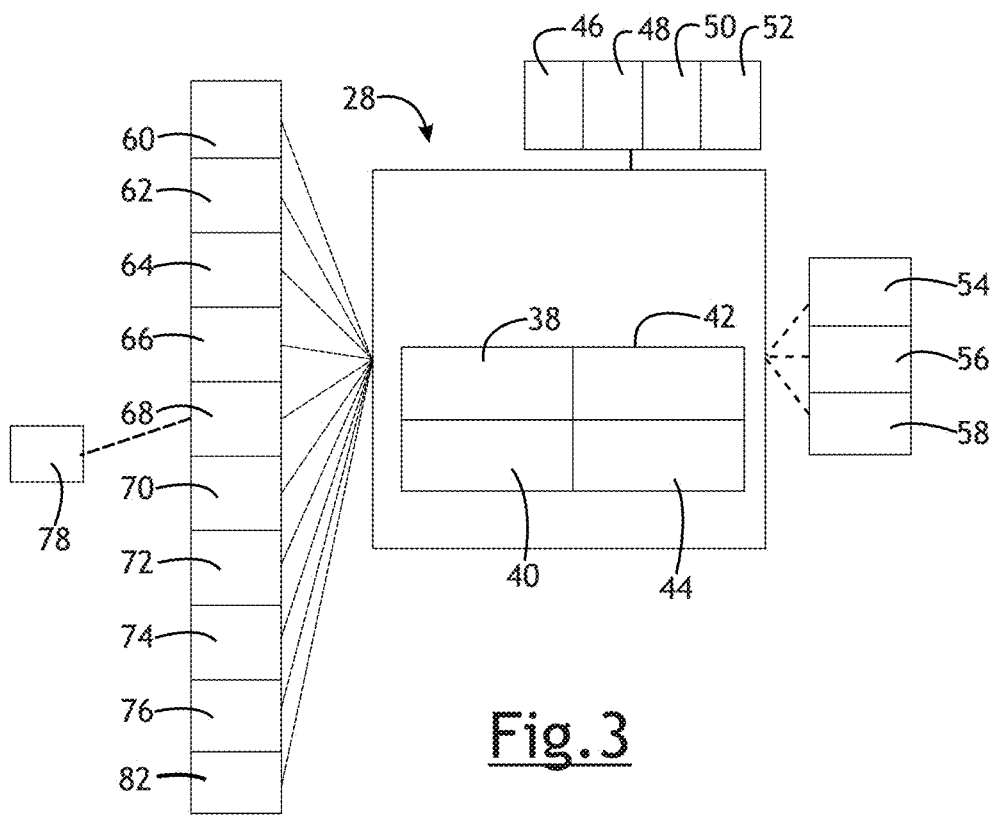
FIG. 3 is a diagrammatic view of a vehicle control system which may define part of a frontend portion of the system.

Referring in more detail to the drawings, FIG. 1 illustrates a vehicle information system 10 including a frontend portion 12 with one or more network vehicles 14 that are traveling along one or more roads and that are in communication with a backend portion 16. The network vehicles 14 are used to determine areas having one or more driving conditions, such as road conditions or environmental conditions, which may be of a nature or type that other vehicles can benefit from being alerted to the driving condition(s). For example, vehicles heading toward or into an area having conditions that reduce road friction, tire traction or otherwise make driving more difficult, can benefit from advance notice of the condition(s). Numerous network vehicles 14 may be spread across a geographic area 20 and enable determination of at least certain driving conditions within the geographic area 20 without direct operator/driver involvement. That is, sensors/cameras and control systems of network vehicles 14 can be operated in the background, and the output thereof analyzed, without driver or passenger involvement, to avoid distractions and enable efficient information gathering and communication.

The system 10 may include a cloud-based component to which vehicles communicate information relating to at least some driving conditions and from which such information may be provided to other vehicles. In this way, a distributed grouping or fleet of network vehicles 14 can each provide information about conditions of interest within different geographic areas 20 and multiple vehicles providing such information can improve the accuracy and scope of the information provided.

With reference to the schematic block diagrams in FIGS. 1 and 2, the vehicle information system 10 may be a cloud-based system that may receive information from individual ones of the network vehicles 14 and send out one or more notifications to multiple network vehicles 14 including information related to one or more conditions of interest. The notifications may be sent out to all network vehicles 14 or only the network vehicles 14 within a predetermined geographic area 20. The system 10 may gather real-time information from network vehicles 14, and the system 10 may analyze the information to determine if a notification should be sent to other vehicles, and if so, the area of interest and which network vehicles 14 are associated with the area of interest.

The term "real-time", as used herein, does not strictly require that such information and notifications be generated, sent, received and/or otherwise processed at the exact moment when their underlying events or conditions occur in order to be "real-time". Rather, these terms broadly include any such information and notifications that are generally contemporaneous with their underlying events or conditions so that the road/environmental conditions information and notifications are still relevant or accurate in the context of the present system and method (e.g., within seconds, minutes or even hours of their underlying events or conditions).

System 10 may deliver hosted services via the internet and/or other communication networks and may be structured as a public, private or hybrid cloud, for example. According to one non-limiting example, vehicle identification system 10 is structured as a private cloud and generally includes the backend portion 16 and the frontend portion 12 that is distributed across a fleet of network vehicles 14, where each network vehicle 14 is capable of obtaining and providing information as well as communicating with the backend portion 16 over a secure communications network 22 (e.g., secure vehicle-to-cloud (V2C) network). The secure communications network 22 may include a cellular-based network 24, a satellite-based network 26, a city-wide WiFi-based network, some other type of communications network and/or a combination thereof. Although only a few network vehicles 14 are shown in the drawings, it should be appreciated that system 10 may interact with a large fleet of vehicles that can include dozens, hundreds, thousands or even more vehicles. System 10 may be used with any vehicles, including (but not limited to) passenger, commercial and/or public transportation vehicles sold in any geographic area.

Backend portion 16 may include any suitable combination of software and/or hardware resources typically found in a backend of a cloud-based system, as best illustrated in FIG. 1. The backend portion 16 may be responsible for managing some of the programs and algorithms that run applications on the frontend portion 12, such as those that request, obtain and optionally analyze information of and from the network vehicles 14. It is noted that the driving conditions information may be analyzed by control systems 28 and processors thereof on-board a network vehicle 14 or by the backend portion 16 or both, as desired. The backend portion 16 may be managed or controlled by the vehicle manufacturer and can be part of a larger cloud-based system that the vehicle manufacturer uses to communicate and interact with a large fleet of vehicles for a multitude of purposes, not just detection or road and environment conditions and related alerts. The backend portion 16 may include or communicate with emergency alert systems, such as those that provide Amber alerts or other missing persons alerts, or law enforcement systems that may provide and receive information regarding vehicles of interest to them.

The backend portion 16 may include any suitable combination of software and/or hardware resources including, but not limited to, components, devices, computers, modules and/or systems such as those directed to applications, service, storage, management and/or security (each of these resources is referred to herein as a "backend resource," which broadly includes any such resource located at the backend portion 16). In one example, the backend portion 16 has a number of backend resources including data storage systems 29, servers 30, communication systems 32, programs and algorithms 34, as well as other suitable backend resources. It should be appreciated that backend portion 16 is not limited to any particular architecture, infrastructure or combination of elements, and that any suitable backend arrangement may be employed.

Frontend portion 12 may include any suitable combination of software and/or hardware resources typically found in a frontend of a cloud-based system, as shown in FIG. 2, and is generally responsible for sending information to the backend portion and receiving notifications and the like from the backend portion 16. Depending on the particular arrangement, the frontend portion 12 may also be responsible for gathering camera, sensor, location and/or other data from devices on the vehicle and sending such information to the backend portion 16. The frontend portion 12 is typically responsible for running the applications that interface with the users in the different vehicles 14, and for interfacing with the programs and algorithms 34 of the backend portion 16. The frontend portion 12 may also be managed or controlled by the vehicle manufacturer and can be part of a larger cloud-based system that the vehicle manufacturer uses to communicate and interact with a large fleet of vehicles for various purposes, as mentioned above. The frontend portion 12 may be distributed across one or more vehicles 14 and may include any suitable combination of software and/or hardware resources including, but not limited to, components, devices, computers, modules and/or systems (each of these resources is referred to herein as a "frontend resource," which broadly includes any such resource located at the frontend portion 12).

In one example, the frontend portion 12 has a number of frontend resources including a vehicle control system 28 having one or more vehicle electronic module(s) installed in vehicles 14, which may include some combination of a data storage unit 38, an electronic control unit 40, applications 42, a communications unit 44 (e.g., one that includes a telematics unit and/or other communication devices), as well as other suitable frontend resources. The control system 28 may be or include a telematics control module (TCM), a body control module (BCM), an infotainment control module, or any other suitable module known in the art. It is not necessary for the preceding units to be packaged in a single vehicle electronic module, as illustrated in FIG. 2; rather, they could be distributed among multiple vehicle electronic modules, they could be stand-alone units, they could be combined or integrated with other units or devices, or they could be provided according to some other configuration. It should be appreciated that frontend portion 12 is not limited to any particular architecture, infrastructure or combination of elements, and that any suitable frontend arrangement may be employed.

The systems and methods may be made to identify the existence of one or more driving conditions for which notifications are to be made to vehicles within one or more geographic areas. A driving condition may be, for example, a road condition that reduces vehicle tire traction on a road, such as wet, snowy or icy roads. Such road conditions can be difficult for a driver or driving system to determine until a vehicle is already affected by the road condition making a loss of traction event more likely.

A loss of traction event, like skidding or sliding of vehicle tires on a road surface, may be determined by actuation of one or more vehicle systems or sensors, generally indicated in FIG. 3. For example, actuation of a vehicle dynamic control system such as an anti-lock brake (ABS) system 46, electronic stability control (ESC) system 48 or traction control (TC) 50 or trailer stability assistance (TSA) system 52 for vehicles with trailers. These systems may utilize information from various sensors, as well as vehicle inputs, and provide outputs that interact with the vehicle control systems 28.

The vehicle inputs may include a throttle input (e.g. accelerator pedal) of a powertrain system 54 and a brake input (e.g. brake pedal) of a brake system 56, and a steering input (e.g. steering wheel or the like) that permits control of the vehicle direction via a suitable steering system 58. The throttle, braking and steering functions may also be done semi or fully autonomously, if desired.

To control various functions of the vehicle 10, the vehicle 10 has a control system 28, among other things, monitors and provides controls for operation of various vehicle systems. For example, the vehicle 10 may include drive by wire, brake by wire and steer by wire systems, or the drive, brake and steering systems may be mechanically linked, as desired, and the control system 28 may be programmed or include instructions to respond to driver action, such as movement of the throttle and brake inputs. The magnitude of the power output from the powertrain system 54 and brake system 56 varies as a function of the driver operation of the throttle and brake inputs, as well as the instructions executed by the control system 28, which may vary in different circumstances and may be implemented in view of variables and by way of look-up tables, maps, algorithms and the like.

To enable control and monitoring of various vehicle operating, environmental and other conditions related to vehicle operation, the control system 28 may include or be communicated with a range of sensors. By way of some examples, the vehicle 10 may include: a speed sensor 60 that provides an indication of vehicle speed; one or more accelerometers 62 responsive to vehicle accelerations in various directions and orientations; wheel speed sensors 64 responsive to the rotational speed of the vehicle wheels; drive input sensors (separate sensors, collectively referred to as 66) that sense the position and/or rate of movement of the throttle, brake and/or steering inputs, position or location sensors 68 or devices (such as GPS or the like) to determine the location of the vehicle; temperature sensors 70 for various things like ambient temperature, engine/motor temperature, and the like; steering angle sensor 72 to enable determination of a vehicle steering angle; energy level sensors 74 like a fuel gauge or battery charge sensor that provide an indication of propulsion energy level remaining in the vehicle energy supply; and various other sensors 76 that may be responsive to or useful in controlling vehicle operation (e.g. current draw of motors, or torque sensors).

In order to perform the functions and desired processing set forth herein, as well as the computations therefore, the control system 28 may include, but is not limited to, one or more controller(s), control unit(s), processor(s), computer(s), DSP(s), memory, storage, register(s), timing, interrupt(s), communication interface(s), and input/output signal interfaces, and the like, as well as combinations comprising at least one of the foregoing, as generally described with regard to the frontend portion 12. For example, the control system 28 may include input signal processing and filtering to enable accurate sampling and conversion or acquisitions of such signals from communications interfaces and sensors. As used herein the terms control system 28 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 28 may be distributed among different vehicle modules, such as an infotainment control module, engine control module or unit, powertrain control module, transmission control module, and the like, if desired, and the memory and one or more processors may be one or both integrated into the vehicle 10 or remotely located and wirelessly communicated to the vehicle 10, as desired.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Various navigation programs 78 (FIG. 3) are known that compute a travel path to a destination, and convey information about the travel path to a driver in the form of visual and/or audible instructions for navigating the vehicle along the travel path. The navigation programs can use information from the location sensor 68 (e.g. GPS) and map data and information relating to road conditions, speed limits, location of intersections and traffic signals, and the level of traffic (such as is available from Waze, GoogleMaps and other applications and sources). This information can be used to define travel paths that are shortest in total distance or time, or that avoid certain road types (e.g. not paved, toll roads, etc) or areas where travel time is less certain, for example, construction zones. The navigation programs 78 may be integrated into the vehicle control system 28 or infotainment system (which may be considered part of the control system), and/or can be resident on a mobile device that is connected to the vehicle 10 by wired or wireless connection.

Navigation programs may use data from numerous tracked vehicles currently traveling along, or that previously traveled along, roads within the travel path to provide crowd-sourced instantaneous and historical information about timing/duration of traffic patterns, average vehicle speeds by road, portions of roads, time of day, day of week, time of year, and the like. From this bulk information provided from many vehicles, the navigation programs can compare different route options that may be used in the travel path, and an estimated total time of travel can be provided, usually in the form of an estimated time of arrival at the chosen destination that is based on travel times and parameters along the entire travel path.

The travel path may include different types of roads, like city roads, rural roads, highways or other higher speed roads, that have different road conditions like speed limits, construction zones, intersections and stopping points which may be defined by traffic signs or traffic lights, for example. In addition to road conditions, the roads may have traffic levels that vary over time and may reduce travel speed as well as the number of stopping, braking and acceleration events when traveling on a road at a given time.

The driving conditions may also include environmental conditions, particularly weather conditions that can reduce road friction and tire traction levels, and so affect the road conditions. Accordingly, the frontend portion 12 or backend portion 16 or control systems 28 and/or a remote device may include one or more programs arranged to provide a weather source 80 (FIG. 2) for weather information. By way of non-limiting examples, the frontend portion 12, or a remote device associated therewith, may download or obtain weather information from one or more remote sources 80, like a weather service or weather database. The weather information may include data relating to presence of, a prediction of, or a rate/intensity of snowfall, rainfall, visibility, and other weather conditions such as wind speeds above a wind threshold (50 mph for example), hail, tornado and dense fog.

Weather or environment conditions may also be determined, at least in part, from one or more vehicle sensors or data output. For example, some vehicles have rain sensors 82 (FIG. 3) that may be used to control windshield wipers or headlights. The use of windshield wipers could also be in data provided from the vehicle, where information that multiple vehicles are using windshield wipers can be used to determine that there is precipitation in that area (whereas a single vehicle could simply be using the windshield washing system and using the wipers to clear off washer fluid from the windshield). Additionally, an ambient temperature in the area of the vehicle can be provided from a temperature sensor 70 of the vehicle.

In at least some implementations, road conditions and/or environmental conditions are monitored with respect to at least loss of traction events as vehicles move within one or more geographic areas 20. For example, loss of traction events can be determined based upon actuation of one or more vehicle systems, as noted herein, including but not limited to vehicle dynamic control systems like ABS 46, ESC 48, TC 50 and TSA 52. Loss of traction events are communicated from the vehicle 10/front end portion 12 to the backend portion 16 and may be logged with regard to one or more event parameters. Example event parameters include vehicle type parameters, like the weight and performance characteristics of the vehicle (acceleration, braking, steering, suspension type), vehicle dynamic parameters at the time of the event like wheel speed, vehicle speed, accelerations, and the like, road conditions like type of road, and environmental conditions like time of day, weather conditions at time of event including temperature and presence of rain, snow or ice, and the like. The event parameters can be rated, for example on a numerical scale having at one end a rating for conditions that lead to maximum tire traction level and at the other end a rating for conditions that lead to a minimum or greatly reduced tire traction level Different types of event parameters can be given individual ratings to make up a total event parameter rating, or the rating can be determined otherwise as desired. For example, the type of road on which the loss of traction event occurred (e.g. paved vs. unpaved) can be rated separately from the weather in which the event occurred which is unrelated to the type of road. Additionally, information about the type of vehicle can be relevant as traction levels can vary among vehicles of different types, having different tires, suspension systems, vehicle weights, acceleration/ deceleration capabilities, and the like. For example, a loss of traction event for a vehicle that does not typically lose traction in conditions like that which the vehicle is currently experiencing may be rated more severely than a loss of traction event for a vehicle that experiences more such events in such conditions.

To provide historical data that may be used, at least in part, to improve the rating of loss of traction events and event parameters, events can be logged in normal weather conditions over a desired period of time, and/or on an ongoing basis. Normal weather is intended to mean weather other than that which directly reduces tire traction, like presence of rain, snow or ice, or temperatures below a low temperature threshold at which vehicle tires are known to have less traction (e.g. below 35 degrees Fahrenheit or other value, as desired). In such normal or non-severe weather conditions, loss of traction events may be due to other factors such as excessive vehicle speed, acceleration (including deceleration during which the ABS 46 may be actuated), and particular vehicle conditions that can lead to loss of traction for specific vehicles while other vehicles do not lose traction. For example, heavier vehicles or vehicles with worn or less than optimal tires may have reduced traction as compared to a nominal traction level.

In at least some implementations, the system may have a threshold traction level and may associate events of certain vehicles as being caused at least in part because the vehicle has a lower than threshold traction rating. This may be done, for example, if the vehicle experiences multiple loss of traction events while other vehicles in the same geographic area are not experience similar loss of traction events (which may indicate, among other things, poor tire condition leading to reduced traction for that vehicle). Further, some vehicles may be driven more aggressively than other vehicles and may have increased loss of traction events compared to a nominal or threshold value for a number of loss of traction events per vehicle. In this way, historical information relating to individual vehicles may be used to rate or otherwise categorize a traction level or a loss of traction event based on historical data for the vehicle that experienced the loss of traction event, as well as the current road conditions and environment conditions. The evaluation and rating of the vehicles and loss of traction events can be done in any suitable way, including with machine learning programs and statistical models, and feedback loops may be provided to refine later determinations from these programs and models.

Figure 4:
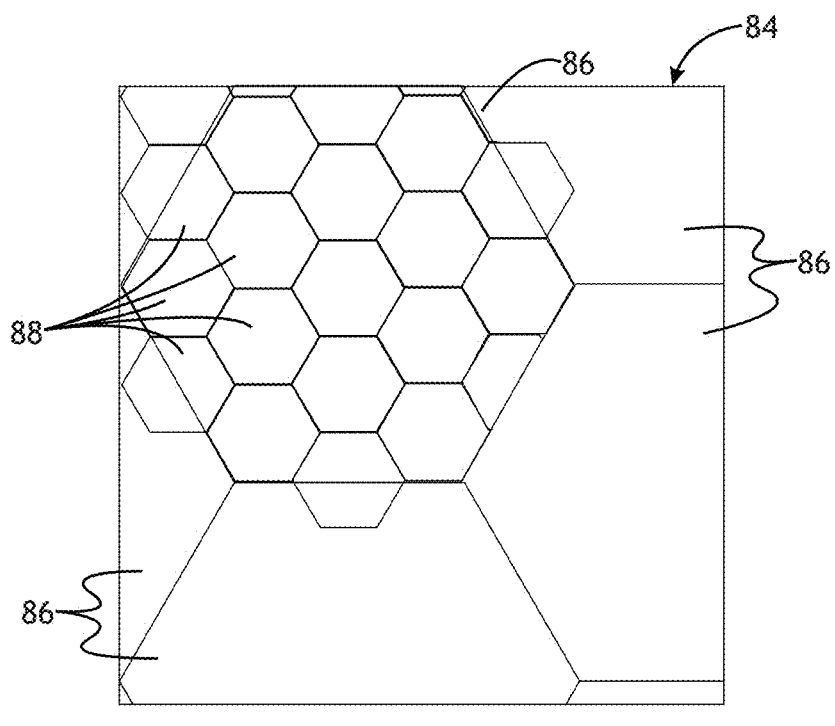
FIG. 4 is a diagrammatic view of a geographic region including smaller subdivided geographic areas.

To improve determinations of road conditions within a given area, the system may divide geographic regions into defined geofenced geographic areas 20 of a desired size. In at least some implementations, as shown in FIG. 4, a larger area 84 is divided into multiple, smaller, first geographic areas 86 that are defined by polygons of a given size and shape. The first geographic areas 86 may be further divided into multiple, second geographic areas 88, and additional subdivisions may be made to improve the resolution of the system. In at least some implementations, such as that shown in FIG. 4, hexagons are used to divide a larger geographic area into smaller geographic areas, in which multiple hexagons can fit into a larger hexagon, providing greater resolution or refinement with smaller hexagons. In FIG. 4, not every first geographic area is shown as including multiple second geographic areas, but that could be the case. Further, the different first geographic areas can include different sizes of, and hence, different numbers of second geographic areas, as desired.

In addition to collecting historical information for vehicles and vehicle types, historical information may also be collected and analyzed for different geographic areas. In each specific geographic area, nominal vehicle operational parameters, such as steering angle, speed, accelerations (in all directions), as well as occurrences of vehicle dynamic control system usage/actuation, can be calculated and logged for each specific geographic area as vehicles navigate through these areas in normal conditions. In this way, benchmark data may be collected for vehicle operation during "normal" or usual weather conditions over time for one or more and up to each geographic region, and from this, areas prone to greater loss of traction events may be identified, and they may be rated or categorized. In later analysis to determine if an instantaneous or real-time road condition or environment condition is causing a greater risk of loss of traction events, the historical information related to a likelihood of loss of traction events can be used in the analysis. Areas with a greater historical rate of loss of traction events might require that a higher threshold of events occur in a given period of time to initiate a further process to determine if a notification should be issued to drivers in or near the area.

In use, the system may use sensor data or signals, such as for wheel speed, steering, braking, forward acceleration, as well as data from systems used during dynamic driving events including loss of traction events, such as ABS 46, ESC 48, TC 50 and TSA 52, to determine one or more road conditions. As loss of traction events occur, or as dynamic control systems of vehicles are utilized to avoid a loss of traction event, such as ABS, TC, ESC and TSA, event parameters (conditions relating to the road, weather, vehicle, etc.) are sent, from the frontend portion 12/each vehicle that experienced an event, to the backend portion 16, or the weather and any other external information (e.g. not specific to the vehicle) may be provided from sources remote from the vehicle instead of the vehicle, as desired. The event parameters include the location of the vehicle and such events are associated with one or more geographic areas 20, and they may be rated or categorized as noted herein, to, among other things, facilitate a determination as to how relevant the event is to other vehicles in the same geographic area 20.

In at least some implementations, the size of a geographic area in which events are initially analyzed is set at least in part as a function of a determined or forecasted weather condition for a relevant geographic area, or historical information for the geographic area or both. By way of a non-limiting example, colder temperatures, determined or predicted rain, snow or ice may decrease the size of a geographic area 20 in which events are initially evaluated (e.g. from a first geographic area 84 to multiple second geographic areas 86). Thereafter, a number of events in a smaller geographic area may cause a reduction in the size of a geographic area being analyzed for the area in which such events occurred and in neighboring or nearby geographic areas.

In at least some implementations, a first geographic area may be determined and then events within that first geographic area are logged or recorded. When a threshold number of events are logged in the first geographic area, then the events, including the location thereof, may be further analyzed to determine if a second threshold number of events occurred within one or more smaller, second geographic areas, and further subdivisions of geographic areas can be reviewed, as desired. Of course, the smallest desired geographic area may be reviewed initially without independently reviewing events for a larger geographic area, as desired.

The events may be logged based upon time of occurrence to aid in determining if there is a present condition causing higher risk or higher rate of loss of traction events. Thresholds may be set for the number of events within a given time period, and this maybe based upon the number of vehicles in an area. For example, if, after a threshold number of events have occurred in a given geographic area during a threshold time period, an alert or notification may be issued to provide notice to other drivers and vehicles about the area in which loss of traction events are occurring, as set forth later. If, after such determination, a high enough number of vehicles travel, without a loss of traction event, through a geographic area 20 in which there previously were at least a threshold number of loss of traction events, then the alert can be terminated, in at least some implementations. In this way, the determinations of risk or higher than threshold rates of loss of traction events can be made time sensitive to avoid providing notifications when the conditions that caused the notification are no longer are determined to exist.

Further, the systems and methods may be set to rate one or more loss of traction events to determine if a road condition or environment condition is the likely cause of the event, or if aggressive driving or driving error is the cause of the event. This may be done as a function of the driving parameters at the time of the event, including vehicle speed, accelerations, braking force, steering angle and the like. Events that are determined to more likely be caused or exacerbated by operation of the individual vehicle and not the road condition or environment condition, may be given a lower rating than events that occur with lesser speed, acceleration, braking force, steering angle and the like, where the rating can be used to determine if other vehicles should be provided a notification about the conditions. In this way, conditions resulting in reduced traction can be better identified by determining loss of traction events that are more likely to be caused by reduced friction/traction of the road than by driver aggression (or other sudden, forceful actuation of the vehicle inputs-brakes, accelerator, steering). The more an event is likely due to reduced friction of the road, the more severely or highly the event may be rated, and with multiple such events, in a particular geographic area, the area can be more closely analyzed and/or an alert issued for that area, or a particular portion thereof.

Severity of environment conditions can also be rated with more severe weather or weather more likely to result in reduced tire traction given a higher rating. Individually, or some combination of operational and road/environment ratings can be analyzed, including a number of events that occur within a geographic region and within a time period, which may include comparing collected data to one or more thresholds, to provide an overall rating or risk index for each geographic area. The rating or risk index for each geographic area will change over time based upon a rate of events recorded in that area over time, and as the determined risk or rating increases or decreases over time.

If, within a geographic area, multiple loss of traction events occur, the system may increase the rating or risk index for all or only a portion of a geographic area, such as a particular segment of a road at which multiple events have occurred, and a notification may be provided to vehicles heading toward that road segment. This may be done by reducing the size of the geographic areas separately considered in that region, or by determining a particular area within a predefined geographic area (e.g. which road and which portion of the road) in which the events have occurred.

This can enable notices to be provided about higher risk conditions in small geographic areas, such as an iced over portion of a road where the remainder of the road and geographic area has a lower risk. For example, some multi-car vehicle accidents sometimes occur in areas of very low traction, and additional cars then become involved in the accident later, as they travel onto the low traction area of the road, lose traction and strike vehicles and objects in the area. These incidents can be quickly identified by the system and notifications can be provided to drivers heading to these areas to reduce the additional vehicles that become involved in the pile-up accidents.

Further, the notices can be limited to vehicles in the area, or heading in the direction of the road segment of higher risk, or likely to head in that direction, so vehicles outside of the area and not likely to head into that rea need not receive the notification. This can reduce the number of notifications that drivers receive that are not relevant to the driver. Receipt of numerous notices that end up not being relevant can be frustrating, and can cause drivers to turn off the notification system or to lose confidence in the accuracy of the system and thereafter ignore or pay less attention to notifications they receive.

The geographic regions and divisions thereof can be implemented using a Geohash method, in at least some implementations. The geohash method divides the earth, or any given geographic area thereof, into small units, and labels each with a unique identifier (ID). For example, smaller second geographic areas that are within the same, larger first geographic area may all have common portions of their IDs, with an ending portion of their IDs differing and indicating the different second geographic areas for each.

By using a geohash method, such as H3 or S2, the road network and location of loss of traction events will be covered with a pre-defined size and assigned with a unique ID. The relationship for similar road type, such as highway ramp, intersections, will be associated based on geohash ID. The linkage between two or multiple nearby locations with loss of traction events or environmental conditions that may cause such events, will be established under the child-parent geohash architecture. For example, if two level 10 geohash IDs share the same parent geohash ID at level 5, they could be considered for similar level of weather impact. In this way, the thresholds can be established based upon level of geohash ID similarities, which indicates the relative geographic proximities of geographic areas.

Figure 5:
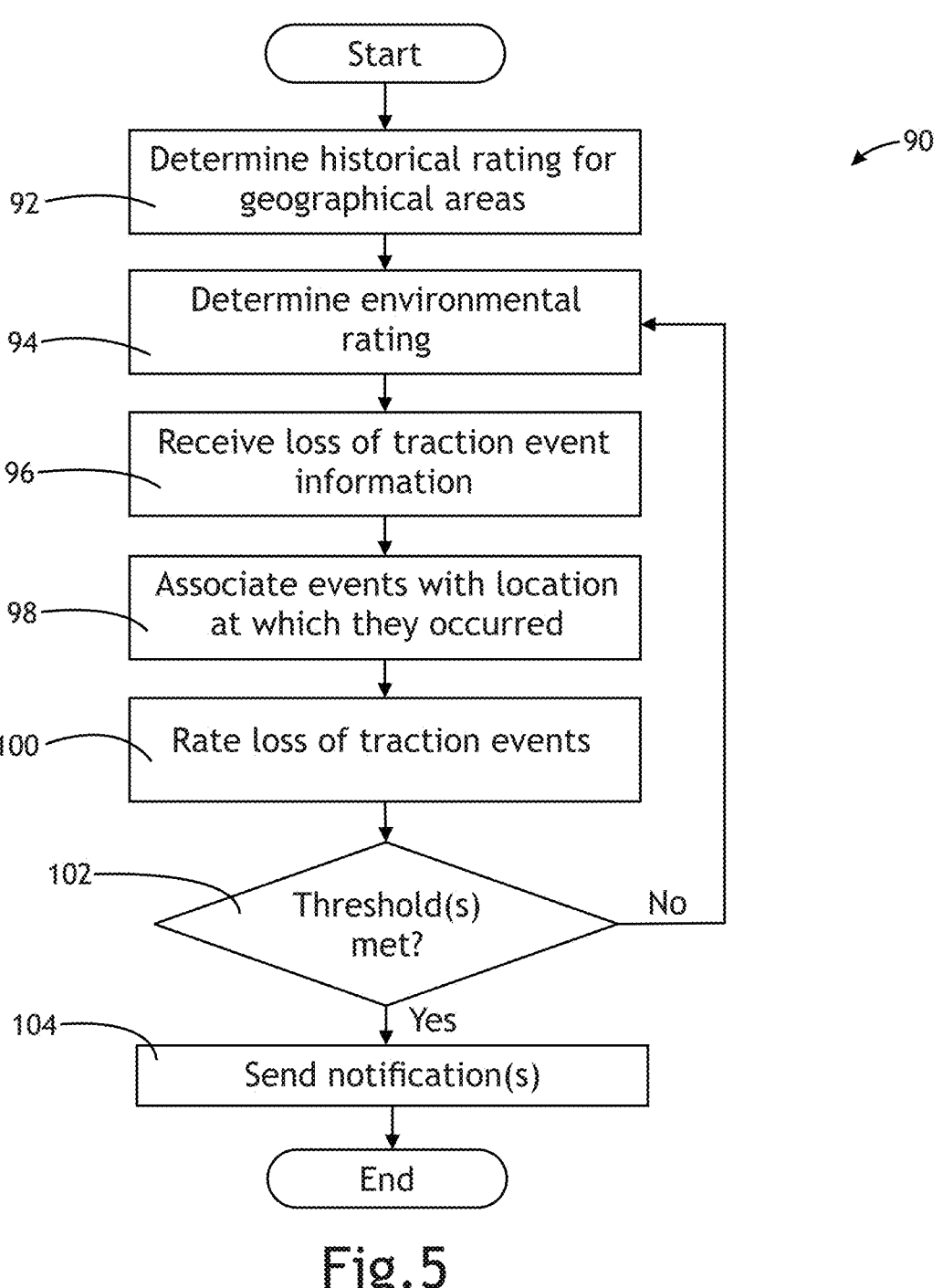
FIG. 5 is a flowchart of a method for determining driving conditions and providing notifications regarding loss of traction events.

FIG. 5 illustrates a method 90 incorporating certain features of this disclosure. The method may begin at step 92 in which geographic areas are rated with regard to historical information relevant to loss of traction events in each geographic area. For example, steeper roads may have a different rating than flat roads as more ABS incidents may occur on steeper roads than flat roads. Roads in which the surface has a lower coefficient of friction, for example, unpaved roads, may have a different rating than roads with a higher coefficient of friction, for example, paved roads, and so on. In this way, one or more baseline parameters or thresholds can be established within each geographic area.

Further, as noted herein, these parameters and thresholds can change as a function of the environmental conditions at any given time. Some areas are more prone than others to lower temperatures, as well as occurrences of snow, ice and other environmental conditions that can reduce tire traction on roads in those areas. These areas may have a rating that reflects this, and the rating may vary as a function of weather conditions at any given time. In this way, in step 94 a current environmental condition rating or threshold is determined. For example, areas in which the ambient temperature is below a threshold, for example, at or below 35 degrees Fahrenheit, may have a higher rating than warmer areas, indicating that loss of traction events are more likely to occur. The rating may change/increase as the temperature decreases further below the threshold as slippery roads may be more prevalent at lower temperatures, and the rating may decrease as the temperature increases. These ratings or weightings in a model may be applied based upon historical information and not (yet) as a function of loss of traction events that occur within a present, active, ongoing time period.

Next, in step 96, information relating to one or more loss of traction events are communicated from vehicles to the backend portion as they occur (e.g. within some time window after, the information is generally time sensitive but need not be instantaneous). In step 98, these events are logged and associated with regard to the location at which they occurred, and in step 100, the events are rated. For example, an event that occurred due to aggressive driving (e.g. high acceleration in one or more directions) may be given a lower rating, and the same may occur for events happening in lower risk environmental conditions. Incidents associated with higher risk environmental conditions and with lesser accelerations or indications of aggressive driving, may be given a higher rating, indicative that the conditions are more likely the cause of the loss of traction event.

In step 102, it is determined if one or more traction related thresholds have been met for a geographic area. The traction related thresholds may relate to, for example, a number of events within a geographic region or conditions otherwise determined to meet a threshold at which a sufficiently high risk for loss of traction events is determined. For example, if it is determined to be raining or snowing, and below a temperature threshold, then this may meet a traction threshold even without a specific loss of traction event having yet occurred. Or one or more loss of traction events may be required for a threshold to be met, regardless of weather, as desired. If the thresholds are not met in step 102, then the method may loop back to a desired point, for example, step 94 to redetermine the environmental rating or conditions, which may affect one or more of the traction thresholds.

If one or more traction related thresholds are met, in step 104, an alert or notification is sent. The alert or notification may be sent, automatically, without requiring human intervention, generation or broadcasting, from the backend portion to one or more vehicles for which such alert or notification is determined to be relevant. In at least some implementations, vehicles currently in the geographic area, or the portion thereof, that is determined to have the above threshold condition(s) can be sent the alert or notification. Additionally, if desired, vehicles heading toward that geographic area can be sent the alert or notification. The heading of the vehicles can be determined based upon information provided from the vehicles regarding their location, which might include the vehicles' directions of travel and speeds, and/or which might include information about an intended path of travel that may be input into a navigation system or program and communicated to the backend portion. The notification may be sent for a period of time in which the traction related thresholds are met or exceeded, and so additional vehicles may receive notifications over time as they near or enter the geographic area for which a notification is sent. The methods and systems may continually or periodically redetermine the risk rating or other parameters and determine if notifications should continue to be sent to relevant vehicles, or if the notifications are no longer needed.

In at least some implementations, the alerts or notifications can be provided to vehicles based on the speed of the vehicle within a particular geographic area. For example, when reduced traction is likely, the severity of that reduction can be determined and alerts or notifications issued to vehicles traveling at a speed greater than a threshold, where the threshold varies as a function of the severity of the determined traction reduction. In this way, vehicles that are traveling more slowly in a given area need not be given the alert or notification while vehicles traveling faster, and therefore more likely to experience a loss of traction event or a more severe loss of traction event, can be provided the notification. Selective alerts or notifications may be particularly useful where the area of reduced traction exists on a portion of a road where vehicles commonly change speed or otherwise experience accelerations because loss of traction is more likely to occur during a vehicle acceleration (in any direction), such as at intersections, highway on-ramps, highway off-ramps, bends or turns in the road, and the like. The parameters for when a vehicle receives the alert or notification, or whether a vehicle receives the alerts or notifications at all, can be selectable by users, if desired.

To enable reduction in the computing effort and resources needed to monitor relevant conditions, geographic areas might only be actively monitored if certain threshold conditions exist, for example, an ambient temperature below a threshold, and/or in areas having more frequent loss of traction events historically. Other geographic areas having good weather and below a threshold for historic loss of traction events, might not be actively monitored and may only be actively monitored when one or more thresholds are exceeded in that area. This can enable use of resources and faster processing of data in areas of greater interest at any particular time. In this way, analysis of areas can be "turned on" and "turned off" in real-time and according to defined parameters.

The systems and methods described herein enable automatic detection of loss of traction events, and automatic determination of when and to which vehicles notifications or alerts should be provided. The systems and methods use networked vehicles that automatically provide to a backend portion of the system, information relating to road conditions, environmental conditions and vehicle parameters. The information may be provided during varying environmental conditions over time, with or without occurrences of loss of traction events, to enable comparison of recent loss of traction events with historical information. The conditions and loss of traction events may be rated by the system using thresholds determined by one or more programs. Specific geographic areas may be determined to have a heightened risk of loss of traction events, and notifications may be provided for those specific geographic areas, for example, when the risk in those areas exceeds a risk threshold. The risk threshold may involve a single threshold rating based upon multiple parameters, or individual thresholds for each parameter or some mix of these strategies.

The notifications may be provided automatically as determined by the system such that human determination and broadcasting is not required. The notifications can be provided to only a subset of vehicles in a geographic area, such as those within or heading toward the specific geographic areas having conditions that caused the notification to be sent. Vehicles not associated with the specific areas need not receive the notifications and so vehicles receive fewer notifications that are not relevant to them, and user confidence in the notifications and the systems is increased.

What is claimed is:

1. A method for determining driving conditions from network vehicles, comprising:

receiving at a backend portion information relating to a loss of traction event;

associating the loss of traction event with a location;

comparing the information relating to the loss of traction event to one or more driving condition thresholds for the location; and sending a notification from the backend portion to multiple vehicles when one or more driving condition thresholds are met, where the driving condition thresholds include a threshold number of multiple loss of traction events, a geographic area threshold for the loss of traction events, one or more environmental condition thresholds relating to at least one weather condition that reduces road friction level and one or more road condition thresholds relating to at least one road condition that reduces road friction level including wet, snowy or icy road conditions.

2. The method of claim 1 wherein a loss of traction event is determined upon actuation of a vehicle dynamic control system.

3. The method of claim 2 wherein the vehicle dynamic control system includes one or more of an anti-lock brake system, electronic stability control system, traction control system trailer stability assistance system.

4. The method of claim 1 which also includes rating a severity of the loss of traction event based upon one or more event parameters, and comparing the rating to a rating threshold.

5. The method of claim 4 wherein the event parameters include information about one or a combination of one or more of vehicle dynamic parameters, vehicle type parameters, road conditions and environmental conditions.

6. The method of claim 5 wherein the vehicle dynamic parameters include at least one vehicle acceleration at the time of the loss of traction event.

7. The method of claim 5 wherein the environmental conditions include an ambient temperature in the location at the time of the loss of traction event.

8. The method of claim 1 which also includes receiving at the backend portion information about one or more environmental conditions including weather conditions that reduce road friction or tire traction level.

9. The method of claim 8 wherein the information about one or more environmental conditions includes forecasted weather information.

10. A method for determining driving conditions from network vehicles, comprising:

receiving at a backend portion information relating to a loss of traction event;

receiving at the backend portion information about one or more environmental conditions which includes forecasted weather information;

associating the loss of traction event with a location;

comparing the information relating to the loss of traction event to one or more driving condition thresholds for the location; and sending a notification from the backend portion to multiple vehicles when one or more driving condition thresholds are met, wherein at least one of the one or more driving conditions thresholds is set as a function of the forecasted weather information, an ambient temperature in the location, or both.

11. The method of claim 4 wherein the rating is determined as a function of one or both of historical information relating to the vehicle associated with the loss of traction event and historical information relating to the location.

12. The method of claim 1 wherein the multiple vehicles to which the notification is sent are determined to be in a geographic area including the location or traveling toward the geographic area including the location.

13. The method of claim 1 wherein the loss of traction event is one of multiple loss of traction events, and each of the multiple loss of traction events is associated with a particular geographic area in which each of the multiple loss of traction events occurred, and wherein the one or more driving condition thresholds includes a threshold for a number of loss of traction events in each particular geographic area.

14. The method of claim 13 wherein each geographic area is rated with regard to a likelihood of a loss of traction event occurring in a threshold time period from the current time.

15. The method of claim 14 wherein the rating for each geographic area is based at least in part on one or a combination of one or more of an ambient temperature in each geographic area, a forecasted weather condition in each geographic area and historical information relating to one or both of road conditions and environmental conditions in each geographic area.

16. The method of claim 15 which includes monitoring information relating to a loss of traction event in each geographic area that has a rating that meets a geographic area rating threshold and not monitoring information relating to a loss of traction event in each geographic area that has a rating that does not meet a geographic area rating threshold.

17. The method of claim 10, which also includes dividing a first geographic area into multiple, smaller second geographic areas, with one of the second geographic areas being the location with which the loss of traction event is associated;

rating each of the second geographic areas with regard to a severity of the one or more environmental conditions;

receiving at the backend portion information relating to multiple other loss of traction events;

associating each of the multiple other loss of traction events with a respective individual one of the second geographic locations in which it is determined that each of the multiple other loss of traction events occurred;

comparing the information relating to each of the multiple other loss of traction events to one or more driving condition thresholds for the individual one of the second geographic locations; and sending a notification from the backend portion to multiple vehicles associated with the individual one of the second geographic locations when one or more driving condition thresholds are met.

US 12,691,883 B2

17

18

18. The method of claim 17 wherein the step of comparing the information relating to each of the one or more loss of traction events includes rating each of the one or more loss of traction events with regard to a severity of the loss of traction event.

19. The method of claim 18 wherein the severity is determined at least in part as a function of a duration of actuation of a vehicle dynamic control system.

20. The method of claim 18 wherein the severity is determined as a function of one or more vehicle dynamic parameters at the time of the loss of traction event.

* * * * *